United States Patent
Braun et al.

(10) Patent No.: US 9,168,969 B2
(45) Date of Patent: Oct. 27, 2015

(54) ECCENTRIC BOTTOM BRACKET ASSEMBLY

(75) Inventors: Travis Braun, Madison, WI (US); Andrew Krautbauer, Madison, WI (US); Michael Leighton, Watertown, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 437 days.

(21) Appl. No.: 13/334,248

(22) Filed: Dec. 22, 2011

(65) Prior Publication Data

US 2013/0165283 A1    Jun. 27, 2013

(51) Int. Cl.
| | |
|---|---|
| F16H 7/10 | (2006.01) |
| G05G 3/00 | (2006.01) |
| F16H 27/02 | (2006.01) |
| B62K 19/34 | (2006.01) |
| B62M 9/16 | (2006.01) |
| F16C 3/28 | (2006.01) |
| F16H 57/022 | (2012.01) |

(52) U.S. Cl.
CPC .................. B62K 19/34 (2013.01); B62M 9/16 (2013.01); F16C 3/28 (2013.01); *F16H 2057/0224* (2013.01); *Y10T 74/18792* (2015.01); *Y10T 74/2114* (2015.01)

(58) Field of Classification Search
CPC .......... B62M 9/16; F16C 23/00; F16C 23/10; F16C 3/28; F16H 1/16; B62K 19/34
USPC ................ 474/112; 74/571.1, 89.14; 384/255
See application file for complete search history.

(56) References Cited

U.S. PATENT DOCUMENTS

| | | | | |
|---|---|---|---|---|
| 628,820 | A | * | 7/1899 | Lamplugh ..................... 301/110 |
| 1,703,218 | A | * | 2/1929 | Wegner ............................. 74/396 |
| 2,069,143 | A | * | 1/1937 | Hammond, Jr. et al. ........ 74/500 |
| 2,366,527 | A | * | 1/1945 | Heath .............................. 474/72 |
| 2,651,239 | A | * | 9/1953 | Schlagel ........................ 409/240 |
| 2,711,935 | A | * | 6/1955 | William ......................... 384/255 |
| 4,237,744 | A | * | 12/1980 | Jolly ............................. 474/116 |
| 4,740,190 | A | | 4/1988 | Pike |
| 4,791,698 | A | * | 12/1988 | Murata ....................... 15/250.13 |
| 4,808,147 | A | | 2/1989 | Graham |
| 5,419,640 | A | * | 5/1995 | Doring ......................... 384/260 |
| 5,810,379 | A | | 9/1998 | Shusterman |
| 6,129,645 | A | | 10/2000 | Burrows |
| 6,322,221 | B1 | * | 11/2001 | van de Loo ................... 359/841 |
| 6,612,597 | B2 | | 9/2003 | Baker et al. |
| 6,895,834 | B1 | * | 5/2005 | Baatz .......................... 74/594.3 |
| 7,217,037 | B2 | | 5/2007 | Dodman et al. |
| 7,854,440 | B2 | * | 12/2010 | Girout et al. .................. 280/259 |
| 8,191,671 | B2 | * | 6/2012 | Sellars et al. ................. 180/348 |
| 8,561,498 | B2 | * | 10/2013 | Domahidy .................... 74/570.1 |
| 2002/0111241 | A1 | * | 8/2002 | Kujira et al. .................. 475/149 |
| 2002/0112555 | A1 | * | 8/2002 | Chikaraishi et al. ...... 74/388 PS |
| 2008/0268994 | A1 | | 10/2008 | Bushnell |
| 2009/0199677 | A1 | | 8/2009 | Domahidy |

* cited by examiner

*Primary Examiner* — William E Dondero
*Assistant Examiner* — Minh Truong

(57) ABSTRACT

A bottom bracket assembly of a bicycle that cooperates in an eccentric or off-center manner with a bottom bracket shell of a bicycle frame. The eccentric bottom bracket assembly has a cylindrical insert with an off-centered opening for receiving a spindle that connects to cranks of the crankset. Rotating the cylindrical insert repositions the off-centered opening relative to at least the longitudinal direction of the bicycle and thus can be used to adjust the tension in the flexible drive member of the bicycle. A worm gear arrangement provides controlled manipulation of the position of the insert relative to the bicycle frame.

16 Claims, 5 Drawing Sheets

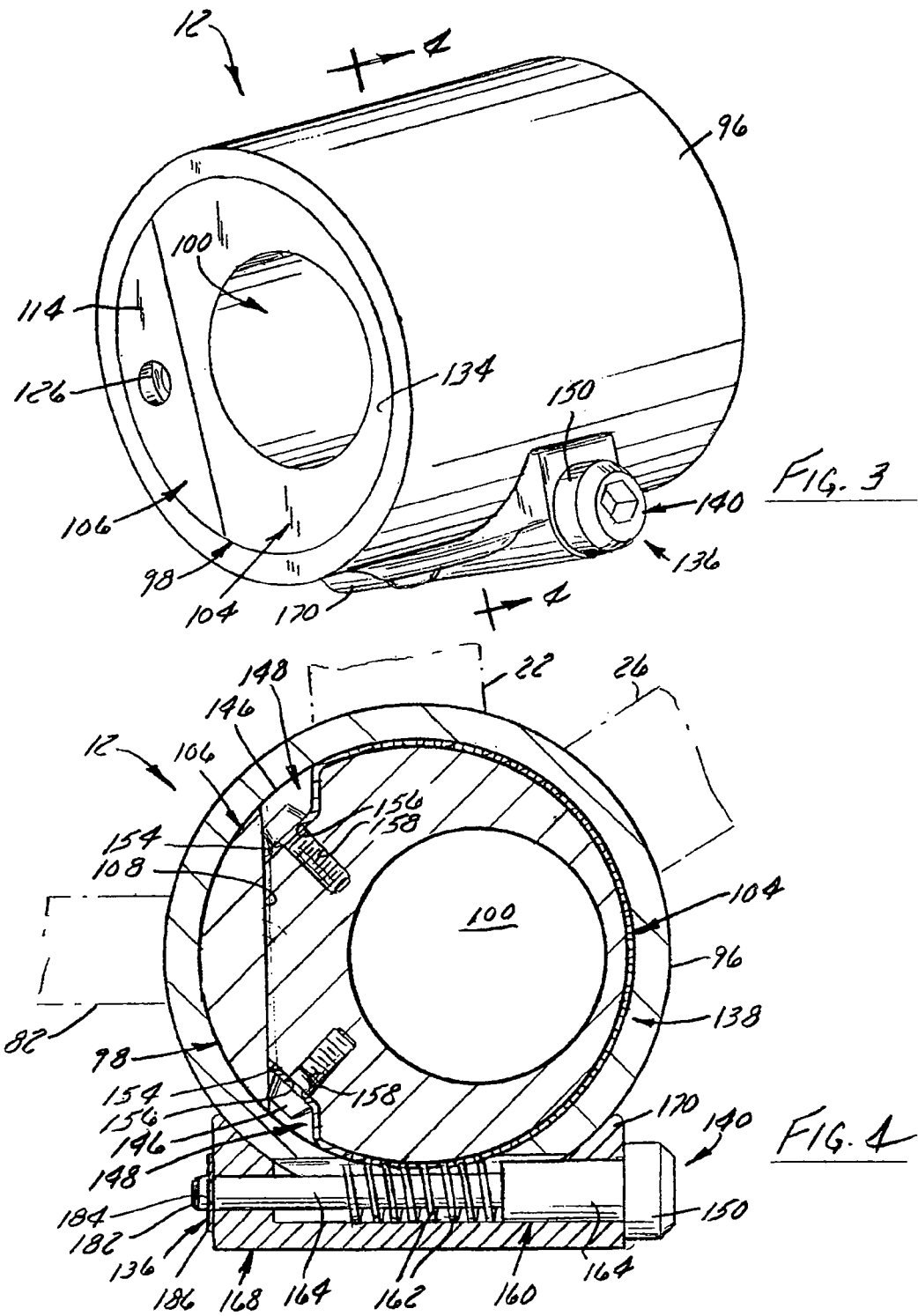

ECCENTRIC BOTTOM BRACKET ASSEMBLY

BACKGROUND OF THE INVENTION

The present invention relates to a bottom bracket assembly for a bicycle and, more particularly, to an adjustable bottom bracket assembly for adjusting the tension of a flexible drive member such as a chain or a belt of the bicycle drive train.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket tube or shell and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket shell. A bottom bracket assembly usually comprises a cylindrical tubular member or spindle for supporting the pedals and corresponding crankset or chainset which cooperate with the flexible drive mechanism or chain to power the bicycle. The bottom bracket assembly commonly slidably cooperates with the bottom bracket shell of the bicycle frame assembly. The seat tube usually extends from the bottom bracket assembly upwardly to where it is joined to the rear end of the top tube. The seat tube also usually functions to telescopically receive a seat post for supporting a seat or saddle for the bicycle rider to sit on.

The chain stays normally extend rearward from the bottom bracket shell. The seat stays normally extend downwardly and rearward from an upper end of the seat tube. The chain stays and seat stays are normally joined together at a rear dropout and cooperate to support the opposite ends of a rear axle associated with the rear wheel. The portion of the frame defined by the head tube, seat post and bottom bracket shell and the structural members that join those three items together is commonly referred to as the main front triangular portion of the frame, with the seat stays and chain stays defining a rear triangular portion of the frame. Understandably, the above description is merely exemplary of one bicycle frame assembly useable with the present invention.

The bottom bracket assembly commonly includes a spindle that is associated with the crankset of the bicycle and allows the crankset to rotate freely relative to the bottom bracket shell when the flexible drive member is dissociated from the drive train. A bearing is commonly associated with one or both of the opposite ends of the spindle and rotationally supports the spindle and corresponding crankset relative to the bottom bracket shell. One or more gears or chain rings and the crankarms associated with the pedals are attached to the spindle such the rotation of the pedals rotates the chain rings which in turn drive the flexible drive members. Commonly, the spindle rotationally cooperates directly with the cavity defined by bottom bracket shell or tube of the bicycle frame. Proper operation of the bicycle drive train relies in part on the proper tensioning of the flexible drive member associated with a respective drive and driven gear or chain ring or crankset gear associated with the drive train.

Commonly, the flexible drive member such as a chain or belt extends between one or more drive and driven members or chain rings associated with the crankset and a gear cassette associated with the driven wheel. Inadequate tensioning of the flexible drive member can result in the flexible drive member becoming disengaged or derailed from desired engagement with a respective drive or driven ring. Commonly, the tension of the flexible drive member is only periodically adjusted via manipulation of the rear wheel relative to an elongated slot that defines the dropout of the driven wheel. During use of a bicycle, the chain or belt can become worn or "stretched" which can result in undesired derailing of the flexible drive member if the bicycle is not properly maintained. Accordingly, it is occasionally desired to monitor and/or adjust the tension of the flexible drive member to ensure desired operation of the drive train.

Rather than manipulating the position of the rear wheel assembly relative to the bicycle frame, other provide means of adjusting the tension of the flexible drive member via manipulation of the bottom bracket assembly relative to the bottom bracket shell of the frame. One type of such a bottom bracket assembly is an eccentric bottom bracket assembly that allows selective translation of the axis of rotation of the spindle relative to the bottom bracket shell. In an eccentric bottom bracket assembly, a cylindrical plug includes a cavity that accommodates the spindle and is shaped to fit into the cylindrical cavity defined by the bottom bracket shell. The plug is commonly machined to accept a spindle such that the axis of rotation of the spindle is offset from the longitudinal centerline of the plug so that rotation of the plug translates the axis of rotation of the spindle relative to the shell so that the axis of rotation of the crankset can be selectively moved fore or aft. Since the chain drive (or other flexible drive) is interconnected between the crankset and a wheel assembly (typically, the rear wheel assembly), this fore or aft movement of the bottom bracket adjusts the tension associated with operation of the flexible drive member or chain. Unfortunately, such systems are not without their drawbacks.

Commonly, such systems include a pair of wedging portion that cooperate with one another to selectively fix the position of the bottom bracket assembly relative to the bottom bracket shell via manipulation of one or more fasteners that translate the wedge portions into one another and thereby compress against the interior contour of the bottom bracket shell. When loose, such assemblies provide no control as to the orientation of the bottom bracket assembly relative to the bottom bracket shell aside from user interaction with crankarms or pedals of the crank assembly. Thus, although such eccentric bottom bracket assemblies allow manipulation of the tension of the flexible drive member, such assemblies do so in a manner that is less than precise and is susceptible to less than desired tensioning of the flexible drive member as a function of the hand, arm, and holding strength of the user or technician performing the adjustment. Accordingly, there is a need for a bicycle flexible drive member adjustment mechanism that can precise adjust the tension of the flexible drive member and does so in a manner that is less susceptible to individualization associated with the skill and strength of the person performing the adjustment.

SUMMARY OF THE INVENTION

The present invention is directed to an adjustable eccentric bottom bracket assembly that overcomes one or more of the aforementioned drawbacks. The bottom bracket assembly allows the tension of the chain (or other flexible member, i.e. belt) of the bicycle drive train to be manipulated in an incremental or infinitely adjustable manner to allow precise control of the tension of the flexible drive member. The assembly includes a bottom bracket assembly that fits within a bottom bracket shell or simply bracket shell of the bicycle frame. The bottom bracket assembly includes a cylindrical insert that is received within the bracket shell and is adapted to support a shaft associated with the crank arms of the pedals of the crankset. The bottom bracket assembly further includes a worm gear arrangement that interfaces with the insert and is operative to rotate the cylindrical insert relative to the bracket shell. As the insert is rotated, via operation of the worm gear arrangement, the distance between the axis of rotation of the crankset and the rear wheel assembly of the bicycle is adjusted. The tension of the flexible drive member can be increased as the axis of rotation of the crankset is moved away from the rear wheel assembly. Thus, the invention allows a user, service personal or technicians, and/or the initial installer to set a desired tension of the flexible drive member via rotational manipulation of the cylindrical insert. It is appreciated that the adjustable bottom bracket assembly is applicable or useable with various bicycle configurations including over-the-road as well as mountain bicycles.

One aspect of the invention discloses an eccentric bicycle bottom bracket assembly that includes a cylindrical insert having an off-centered opening adapted to receive a shaft connected to a pair of cranks of a bicycle crankset. A worm gear arrangement is operatively engaged with the cylindrical insert to rotate the cylindrical insert such that rotational manipulation of the orientation of the insert relative to a bottom bracket shell manipulates the tension of the flexible drive member.

Another aspect of the invention that is useable with one or more of the features of the above aspects discloses a drive train or drive system for a bicycle having a crankset that includes a set of pedals and a first sprocket that is connected to the crankset and rotatable with revolution of the set of pedals. A second sprocket is adapted to drive a wheel of the bicycle and a flexible drive member extends between the first and the second sprockets. An eccentric bottom bracket assembly is engaged with the crankset and cooperates with an outer shell or bottom bracket shell that includes an inner surface defining an opening. A worm wheel is positioned in the opening and is connected to the eccentric bottom bracket assembly. A worm is engaged with the worm wheel such that rotation of the worm manipulates a position of the crankset relative to the outer shell thereby adjusting tension in the flexible drive member via manipulation of the worm.

Another aspect of the invention useable with one or more of the features of the above aspects discloses a method of adjusting tension of a flexible drive member of a bicycle drive train wherein the method includes rotating a worm that is engaged with a worm wheel to manipulate a position of an axis of rotation of a crankset relative to a bicycle frame. Understandably, such manipulation modifies the tension of the flexible member of the drive train of the underlying bicycle.

It is appreciated that these aspects are not mutually and/or individually exclusive with respect to one another. These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention. In the drawings:

FIG. 3 is an isometric view of a bottom bracket assembly according to one embodiment of the invention;

FIG. 4 is a section view of the bottom bracket assembly taken along line 4-4 of FIG. 3;

Figure 1:
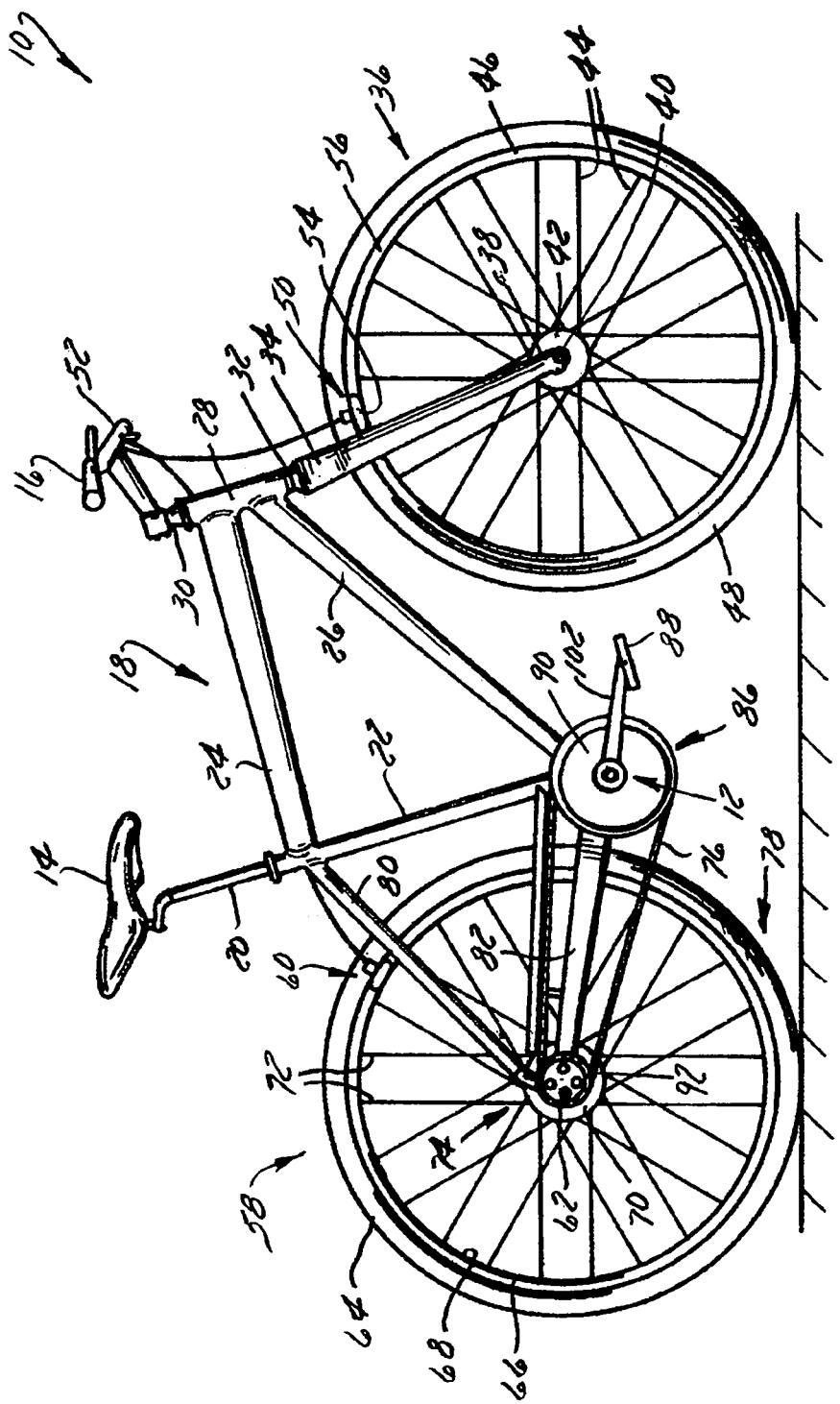
FIG. 1 is a side elevation view of a bicycle equipped with an adjustable bottom bracket assembly according to the present invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

Figure 2:
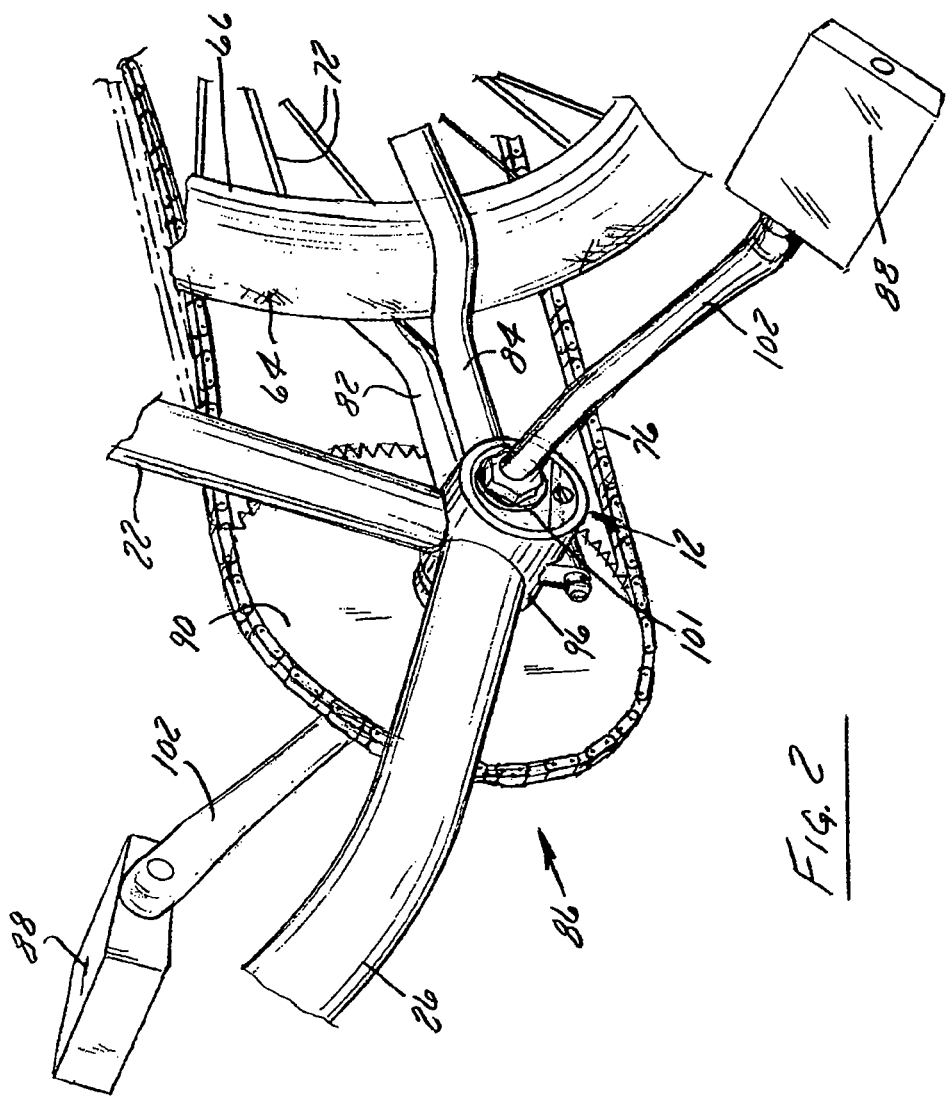
FIG. 2 is a top, left enlarged isometric view of a forward portion of the drive train of the bicycle of FIG. 1.

With reference to FIGS. 1 and 2, a bicycle 10 is shown having a bottom bracket assembly 12 according to the present invention. Bicycle 10 includes a seat 14 and handlebars 16 that are attached to a frame assembly 18. A seat post 20 is connected to seat 14 and slidably engages a seat tube 22 of frame assembly 18. A top tube 24 and a down tube 26 extend forwardly from seat tube 22 to a head tube 28 of frame assembly 18. Handlebars 16 are connected to a stem 30 that passes through head tube 28 and engages a fork crown 32.

A pair of forks 34 extend from generally opposite ends of fork crown 32 and are constructed to support a front wheel assembly 36 at an end of each fork or a fork tip 38. Fork tips 38 engage generally opposite sides of an axle 40 that supports a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 16 and a pair of brake pads 54 positioned on generally opposite sides of front wheel assembly 36. Brake pads 54 are constructed to engage a brake wall 56 of rim 46 thereby providing a stopping or slowing force to front wheel assembly 36. A rear wheel assembly 58 includes a similar rim brake assembly 60 although either of front and/or rear wheel assemblies could be provided with rotor type braking assemblies. Regardless of the specific configuration of the respective braking system, similar to front wheel assembly 36, rear wheel assembly 58 also includes a skewer, shaft, or axle 62 that secures rear wheel assembly 58 to frame assembly 18 of bicycle 10.

Rear wheel assembly 58 includes a tire 64 that is supported by a wheel 66. Wheel 66 includes a rim 68 that is offset from a hub 70 by a number of spokes 72. Alternatively, wheel 66 could include laterally opposite discs that extend between rim 68 and hub 70. Hub 70 cooperates with axle 62 such that wheel 66 rotates about an axis of axle 62 relative to frame assembly 18 during use of bicycle 10. Rear wheel assembly 58 and axle 62 can either be positionally fixed with respect to bicycle frame assembly 18 or be selectively pivoted about an axis of a wheel support assembly 74 to provide an initial adjustment of a flexible member 76, such as a chain or a belt, of a drive train 78 of bicycle 10, and as is further described in U.S. Pat. No. 7,918,474, the disclosure of which is incorporated herein.

Frame assembly 18 includes a pair of seat stays 80 (only one of which is visible in the figures) and a pair of chain stays 82, 84 that offset rear axle 62 from a crankset 86 of bicycle 10. As described further below, stays 80, 82, and 84 are oriented to generally flank rear wheel assembly 58. Preferably, frame assembly 18 includes a pair of seat stays and a pair of chain stays that are positioned on and support the generally laterally opposite sides of wheel assembly. Understandably, it is envisioned that a single chain stay and a single seat stay of robust construction could be provided such that wheel assembly 58 could be mounted in a cantilevered fashion relative thereto.

Crankset 86 includes a set of pedals 88 that are operationally connected to the flexible drive member or flexible member 76 via a drive gear such as a chain ring or sprocket 90. Rotation of flexible member 76 communicates a drive force to a rear section or driven element(s), pulley(s), gear(s) that, in a multi-ratio free-wheel capable configuration, is commonly referred to as a cassette 92. In a free-wheel cassette configuration, rotation of flexible member 76 in a driving direction drives cassette 92 which is turn rotates rear wheel assembly 58 so as to propel bicycle 10 in a forward direction. Understandably, the present invention is applicable to other drive train configurations such as fixed gear or non-free wheel drive train configurations.

In a preferred multi-gear embodiment, crankset 86 and cassette 92 can each include one or more variable diameter drive train members so that drive train 78 can be operated at a number of gearing ratios. It is further appreciated that the construction of the drive train members will also vary as a function of the type of flexible drive 76. That is, the construction and operation of the drive train members associated with crankset 86 and/or cassette 92 when flexible drive 76 is provided as a belt will most likely not be the same as those associated with drive train systems equipped with a chain. Such differences are readily appreciated. It is envisioned that the present invention be usable with belt and chain, single and multiple gear, bicycle drive train systems. It is further appreciated that use of a wheel mount assembly according to the present invention is not limited to rear wheel assemblies of two-wheel bicycles.

Regardless of the specific modality of flexible drive 76, forward rotation of a driving gear sprocket 90 drives cassette 92 to rotate in a forward bicycle driving direction. Cassette 92 is generally concentrically orientated with respect to rear axle 62. Cassette 92 is operationally connected to hub 70 of a rear wheel 66 of rear wheel assembly 58. A number of spokes 94 extend radially between hub 70 and a rim 68 of rear wheel 66. As is commonly understood, rider operation of pedals 88 drives flexible drive 76 thereby driving rear wheel 66 which in turn propels bicycle 10.

With additional reference to FIG. 3, the bottom bracket assembly 12 cooperates with or includes a bottom bracket shell or outer shell 96 that is coupled to the seat tube(s) 22 and the down tube 26. Bottom bracket assembly 12 includes a cylindrical insert 98 that is carried within outer shell 96 and has a transversely extending opening 100 through which a shaft or spindle 101 extends. Crank arms 102 associated with pedals 88 are attached to opposite ends of the spindle in a conventional manner. As known in the art, a chain ring or sprocket 90 is connected to or otherwise engaged with one of the crank arms 102 adjacent one end of the spindle so that the chain ring 90 rotates, and thus the flexible member 76 translates, during rotation of the set of pedals 88.

Cylindrical insert 98 includes a body member 104 and a wedge member 106 that cooperates with body member 104. Body member 104 has a flat outer surface 108 and the wedge member 106 also has a flat inner surface 110 (FIG. 5) that is adapted to fit against the flat outer surface 108 of the body member 104. The wedge member 106 further has a curved outer surface 112 opposite the flat inner surface 110. The curved outer surface 112 is raised from the flat inner surface 110 by a forward face 114. The wedge member 106 is constructed such that the curved outer surface 112 tapers from the forward face 114 toward its rear edge 116. The curved outer surface 112 has a curvature that is substantially matched to the curvature of the inner surface (not numbered) of the outer shell 96.

That is, the cooperation between the body member 104 and the wedge member 106 allows the body member 104 to first be inserted into the outer shell 96 and then the wedge member 106 slid into place to secure the two pieces within the outer shell 96. Lateral translation between flat surfaces 108, 110 of body member 104 and wedge member 106 manipulates the combined collective diameter of insert 98 such that insert 98 can be loosely engaged with the inner surface of shell 96 and securely engaged with the inner surface of shell 96 via manipulation of a fastener as described further below.

Wedge member 106 further has an elongated bolt hole 118 that communicates with a transverse nut slot 120. The bolt hole 118 communicates with a hole 122 formed in the rear face (not shown) of the body member 104. A fastener such as a bolt 124 may be inserted into the hole 122 and received by a nut 126 which has a threaded hole 128 that fits within the bolt hole 118 when properly seated into the nut slot 120. Bolt 124 has a head 130 from which a threaded shaft 132 extends. The bolt 124 can be fastened to the nut 126 in a conventional manner. When the bolt 124 is secured to the nut 126, the head 130 will be captured in the body member 104 whereas the nut 126 is captured in wedge member 106. This, in effect, secures the wedge member 106 to the body member 104.

It will be appreciated that the body member 104 has a forward face 134 that aligns with the forward face 114 of the wedge member 106 when the wedge member 106 is fully seated within the outer shell 96. It is understood however that the forward face 114 of the wedge member 106 may extend outwardly or inwardly from the forward face 134 of the body member 104 in some circumstances, i.e., with smaller or larger diameter outer shells. In this regard, the wedge member 106 allows the cylindrical insert 98 to be used with outer shells that are not precisely matched to the cylindrical insert 98 or shells 96 that have different diameters.

As known in the art, eccentric bottom brackets are commonly used with bicycles because such brackets allow an installer to adjust the tension in the bicycle chain or similar drive chain by rotating the bottom bracket relative to its shell. This rotation causes a slight adjustment in the height of the crankset but also causes a lateral (fore and aft) movement of the crankset. When the lateral movement is toward the front wheel assembly 36, tension in the chain drive is added. Conversely, if the lateral movement is toward the rear wheel assembly 58, tension in the chain drive is reduced. The bottom bracket assembly 12 of the present invention has an eccentric cylindrical insert 98 which can be rotated to adjust the tension in the flexible member 76, i.e., chain or belt, but includes an operating or adjustment drive system that allows manipulation of the bottom bracket assembly 12 when the bottom bracket assembly is "loose" so as to maintain the orientation of the bottom bracket assembly relative to the shell even when the wedging association is "loose."

The position of the cylindrical insert 98 relative to the bottom bracket shell is manipulated by a worm gear arrangement 136 that generally consists of a worm track 138 and a worm 140. The worm track 138 sits in a channel 142 formed in the outer surface 144 of the cylindrical insert 98 and, more particularly, the body member 104. The worm track 138 is secured to the body member 104 by a pair of fasteners 146 such that the worm track and body member define a worm gear or worm wheel of the worm drive system. As best shown in FIG. 4, a portion of the body member 104 is recessed from the outer shell 96, which provides a space 148 for the head 150 of the worm 140 to be inward of the inner surface of the outer shell 96. Such a configuration prevents lateral translation of the insert relative to the bottom bracket shell when the wedging association is "loose" and also maintains the orientation of the insert relative to the shell without operation of the worm even when the wedging association is "loose."

The worm track 138 has a curvilinear and flat body 152 that terminates in a pair of flanges 154, each of which has an eyehole 156 that aligns with a bore 158 formed in the channel 142. The aforementioned fasteners 146 pass through the eyeholes 156 and cooperate with bores 158 thereby securing the worm track 138 to the cylindrical insert 98.

The worm shaft or simply the worm 140 consists of an elongated shaft 160 that extends from head 150. A set of generally helical teeth or threads 162 are formed generally at a mid-point of the elongated shaft 160 leaving a pair of unthreaded portions 164 at respective alternate ends thereof. As will be described more fully below, the threads 162 of worm engage notches 166 in the worm track 138 to facilitate translation of the worm track 138 relative to the worm 140 and thereby rotation of the bottom bracket assembly relative to outer shell 96. It is further appreciated that the structure of worm track 138 could be integrally formed in the radially facing exterior wall of the insert provided such structure is positioned and shaped to operatively interact with a corresponding worm.

The worm 140 is received in a worm barrel 168 that is attached to, or integrally formed with, the outer shell 96. The worm barrel 168 has a curvilinear mount 170 with a slightly curved groove 172 formed therein. The curvature of the mount 170 substantially matches the curvature of the outer surface of the outer shell 96. The groove 172 aligns with and is open to a passage or cutout 174 formed in the underside of the outer shell 96 such that the passage is fluidly connected to the laterally extending opening that is defined by outer shell 96 and configured to rotationall receive the insert. The cutout 174 is formed between a pair of mounting holes 176 that align with corresponding mounting holes 178 formed in the worm mount 170. Fasteners 180 are used to secure the mount 170 to the underside of the outer shell 96. The cutout 174 extends over a length of the worm track 138 to allow the threads 162 of the worm 140, which are seated in the groove 172, to operatively engage the notches 166 of the worm track 138.

Figure 5:
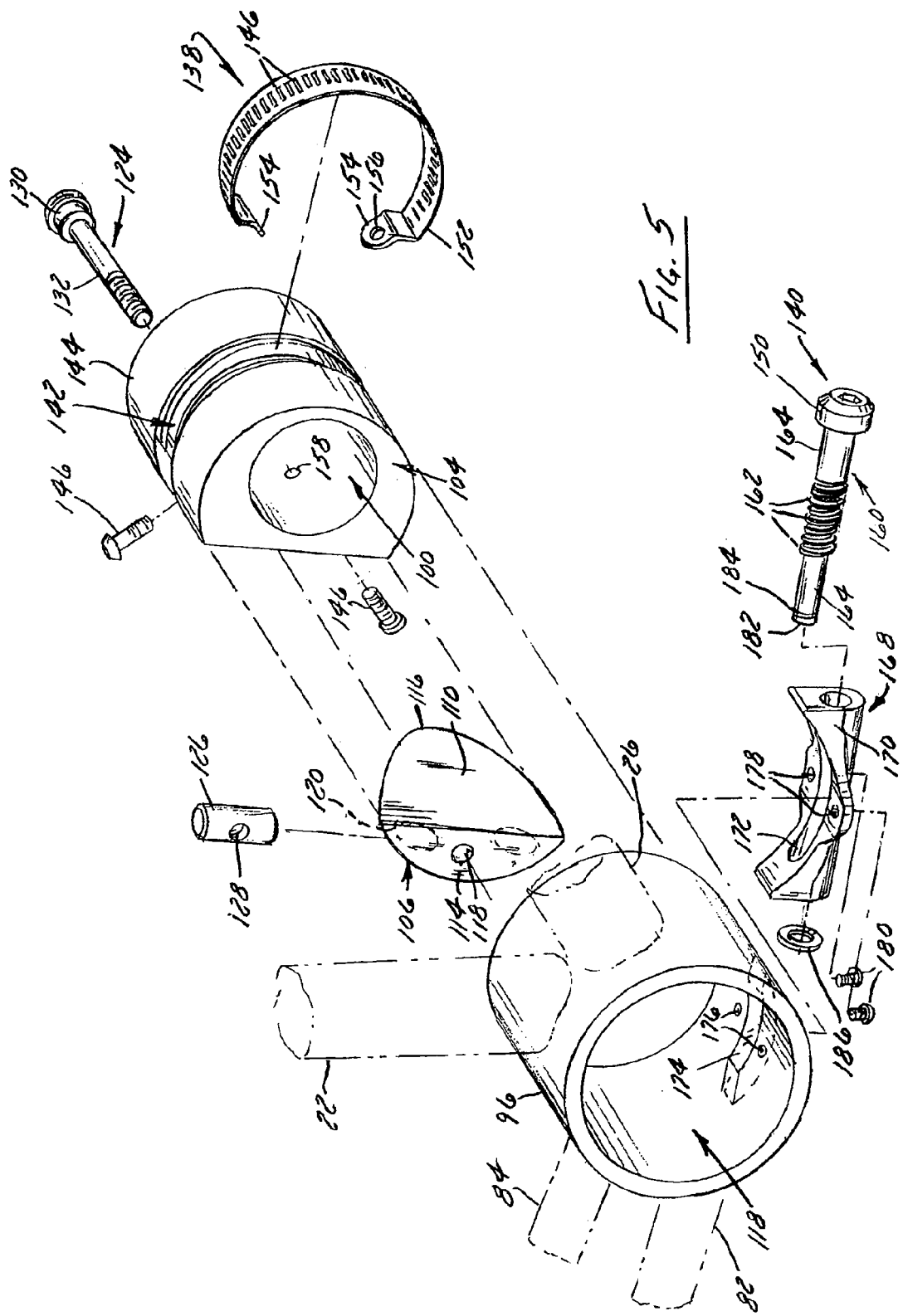
FIG. 5 is an exploded view of the bottom bracket assembly of FIG. 3.

As best shown in FIGS. 4 and 5, the distal end 182 of the worm 140 preferably extends outboard of the mount 170. A circular groove 184 is formed adjacent the distal end 182 of the worm 140 and is adapted to receive a washer 186. The washer 186, which sits outward of the mount 170, secures the worm 140 within the mount 170 and also allows the worm 140 to rotate freely when a driver (not shown) is engaged with the head 150 of the worm 140 and the wedging cooperation of the insert is in a "loose" configuration. It is further appreciated that worm and worm gear can be configured to provide the locking interaction associated with the wedging cooperation of the insert. That is, it is appreciated that securely fixing the position of the worm would fix the position of the insert relative to the bottom bracket shell via the overlapping interaction between the teeth of the worm and the teeth of the worm wheel.

Figure 6:
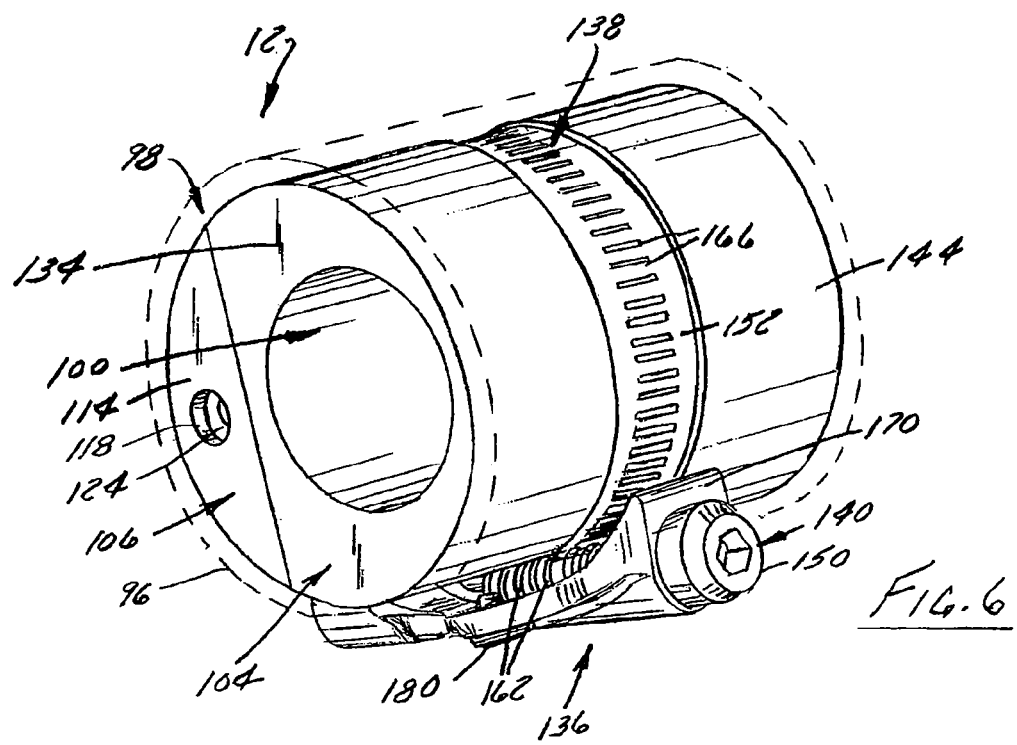
FIG. 6 is an isometric view of the bottom bracket assembly showing a first position of the bottom bracket assembly relative to an outer shell of the bicycle frame assembly which is shown in phantom.
Figure 7:
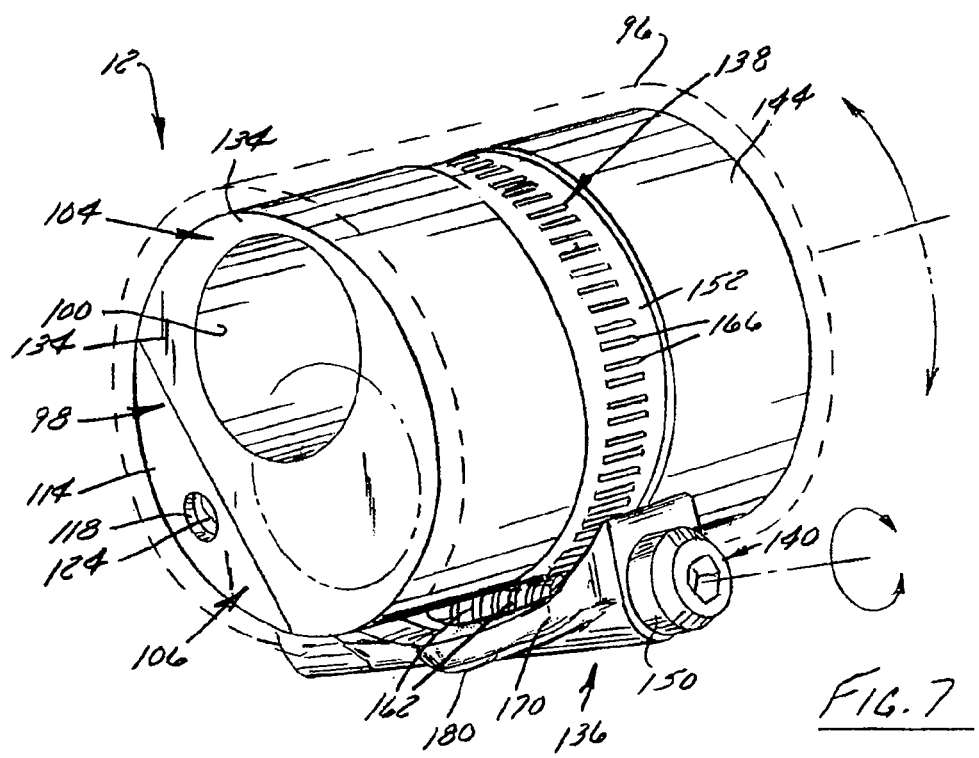
FIG. 7 is a view similar to FIG. 6 showing the bottom bracket assembly in a second position relative to the bottom bracket shell.

Turning now to FIGS. 6 and 7, two different positions of the cylindrical insert 98 relative to the outer shell 96 (which is shown in phantom) are shown. In general, the position of the cylindrical insert 98 shown in FIG. 7 is approximately forty-five degrees (in the counterclockwise direction) from the position shown in FIG. 6, which is best discerned by comparing the relative positions of the opening 100. However, because the opening 100 is off-centered with respect to an axis of rotation of the insert relative to the shell, the aforementioned rotation of the cylindrical insert 98 also results in the opening 100 being shifted, at least partly, in a lateral direction relative to the axis of rotation of the crankset or in a direction that includes a vector component that is aligned with a longitudinal axis of the bicycle. That is, in the position of FIG. 7, the opening 100 is closer to the imaginary center axis of the outer shell 96. So, assuming the views of the bottom bracket assembly 12 in FIGS. 6 and 7 were matched to the view shown in FIG. 2, the aforementioned rotation of the cylindrical insert 98 would tighten or add tension to the flexible member 76 associated with the drive train.

To rotate the eccentric bottom bracket, and thus add or remove tension from the flexible member 76, an installer simply has to engage a driving tool, such as an Allen wrench, with the head 150 of the worm 140. Rotating the worm 140 in a first direction (e.g., clockwise) causes the threads 162 to "creep" up the worm track 138. However, because the worm 140 is fixed in the mount 170, and thereby positionally fixed with respect to the bottom bracket shell, the worm track 138 secured to the insert creeps along the elongated shaft 160, which results in the cylindrical insert 98 thereby rotating the insert in a clockwise direction (in the view shown in FIGS. 6 and 7) relative to the bottom bracket shell and thereby translates the axis of rotation of spindle 101 passing therethrough in a direction away from rear wheel assembly 58 and the associated gear and/or gear cassette. On the other hand, rotating the worm 140 in the opposite direction causes the cylindrical insert 98 to rotate in the opposite (e.g., counterclockwise) direction. The pitch of the threads 162 and corresponding pitch of or number of notches 166 provides for far greater precision in setting the position of the cylindrical insert 98, and thus the tension of the flexible member 76, than other types of eccentric bottom bracket assemblies. As mentioned above, the driving interaction between the worm and worm gear also provides a static position holding interaction between the insert and the bottom bracket shell such that, even when the wedging bias of the insert is released or loosened, the toothed interaction between the insert and the worm maintains the relative position of the insert relative to the bottom bracket shell. Such a configuration allows the person adjusting the tension of the flexible drive train member to accurately control the tension of the flexible drive member without manually biasing the insert and/or crankset to achieve the desired tension of the flexible drive member. Such a configuration also limits the unintended disengagement of the flexible drive member with the drive train caused by the unanticipated initial loosening of the wedging association of the insert with the bottom bracket shell.

Therefore, one embodiment of the invention includes an eccentric bicycle bottom bracket assembly having a cylindrical insert with an off-centered opening adapted to receive a shaft connected to a pair of cranks of a bicycle crankset. A worm gear arrangement is operatively engaged with the cylindrical insert to rotate the cylindrical insert such that rotational manipulation of the orientation of the insert relative to a bottom bracket shell manipulates the tension of the flexible drive member.

Another embodiment of the invention that is useable with one or more of the features of the above embodiment includes a drive train or drive system for a bicycle having a crankset that includes a set of pedals and a first sprocket that is connected to the crankset and rotatable with revolution of the set of pedals. A second sprocket is adapted to drive a wheel of the bicycle and a flexible drive member extends between the first and the second sprockets. An eccentric bottom bracket assembly is engaged with the crankset and cooperates with an outer shell or bottom bracket shell that includes an inner surface defining an opening. A worm wheel is positioned in the opening and is connected to the eccentric bottom bracket assembly. A worm is engaged with the worm wheel such that rotation of the worm manipulates a position of the crankset relative to the outer shell thereby adjusting tension in the flexible drive member via manipulation of the worm.

Another embodiment of the invention that is useable with one or more of the features or embodiments above includes a method of adjusting tension of a flexible drive member of a bicycle drive train wherein the method includes rotating a worm that is engaged with a worm wheel to manipulate a position of an axis of rotation of a crankset relative to a bicycle frame.

The present invention has been described in terms of the preferred embodiment, and it is recognized that equivalents, alternatives, and modifications, aside from those expressly stated, are possible and within the scope of the appending claims.

What is claimed is:

1. A drive system for a bicycle, comprising:
   a crankset that includes a set of pedals;
   a first sprocket connected to the crankset and rotatable with revolution of the set of pedals;
   a second sprocket adapted to drive a wheel of the bicycle;
   a flexible drive member extending between the first and the second sprockets;
   an eccentric bottom bracket assembly that is engaged with the crankset, the eccentric bottom bracket assembly including an outer shell having an inner surface and defining an opening;
   a worm wheel positioned in the opening and connected to the eccentric bottom bracket assembly, wherein the crankset is offset from a center of the worm wheel; and
   a worm engaged with the worm wheel such that rotation of the worm manipulates a position of the crankset relative to the outer shell thereby adjusting tension in the flexible drive member;
   wherein the worm wheel includes a removable curvilinear track that is fastened to the circumference of the worm wheel, the worm wheel includes a cylindrical body having an outer surface with a groove formed therein; the track lies in the groove that is engaged with the worm; and the track comprises a plurality of notches formed radially through the track.

2. The drive system of claim 1 further comprising passage formed in the shell in fluid communication with the opening defined thereby and a worm mount attached to the outer shell over the passage so that the worm interacts with the worm track when the worm mount is positioned over the passage.

3. The drive system of claim 2 wherein the worm wheel has a body member and a wedge member, and wherein the groove is formed in the body member.

4. The drive system of claim 3 further comprising an off-centered opening formed in the worm wheel and a spindle, having first and second ends and being disposed in the opening, and wherein the crankset further has first and second crank arms that are connected to one of the first and the second ends of the spindle, respectively.

5. The drive system of claim 1 wherein the outer shell is integrally formed with the bicycle frame.

6. The drive system of claim 1 further comprising an axis of rotation of the worm that is aligned with a longitudinal axis of the bicycle frame.

7. An eccentric bottom bracket assembly for use with a bicycle frame, comprising:
   a cylindrical insert having an off-centered opening adapted to receive a shaft connected to a pair of cranks of a bicycle crankset; and
   a worm gear arrangement operatively engaged with the cylindrical insert to rotate the cylindrical insert;
   wherein:
   the cylindrical insert has an outer surface and a channel formed in the outer surface,
   the worm gear arrangement includes a removable track that lies in the channel and is fastened to the channel of the cylindrical insert, and the track comprises a plurality of notches formed radially through the track.

8. The eccentric bottom bracket assembly of claim 7 wherein the worm gear arrangement further includes a worm shaft that, when rotated, causes translation of the track.

9. The eccentric bottom bracket assembly of claim 8 further comprising an outer shell having an inner surface defining an opening into which the cylindrical insert is loaded, and wherein the outer shell includes a worm mount that holds the worm shaft in engagement with the track.

10. The eccentric bottom bracket assembly of claim 9 wherein the outer shell is integrally formed with the bicycle frame.

11. The eccentric bottom bracket assembly of claim 9 further comprising a cutout in the outer shell and the worm mount being attached to the outer shell, the worm mount having a groove that is open to the cutout in the outer shell, and wherein the worm shaft has a threaded portion that sits in the groove of the worm mount.

12. The eccentric bottom bracket assembly of claim 9 wherein the cylindrical insert includes a body member and a wedge member that movably cooperate with one another to allow the body member to be initially inserted into the opening of the outer shell and allows the wedge member to be inserted into a space between the body member and the inside surface of the outer shell.

13. A method of adjusting tension of a flexible drive member of a bicycle drive train, comprising:
   rotating a worm that is engaged with a worm wheel to manipulate a position of an axis of rotation of a crankset relative to a bicycle frame;
   wherein the worm wheel includes a cylindrical body having an off-centered opening formed therein and wherein the off-centered opening is adapted to receive a spindle attached to the crankset, the cylindrical body has an outer surface and a channel formed in the outer surface,
   wherein the worm wheel includes a removable track fastened in the channel to the cylindrical body, and wherein rotating the worm causes the removable track to crawl along the threaded shaft to rotate the cylindrical body relative to the worm, and the track comprises a plurality of notches formed radially through the track.

14. The method of claim 13 wherein the worm has a threaded shaft that extends from a head and wherein rotating the worm includes engaging a driving tool with the head of the worm and then rotating the driving tool.

15. The method of claim 14 further comprising moving the off-centered opening fore or aft in response to rotation of the worm.

16. The method of claim 13 further comprising adjusting a diameter of the worm wheel to one of fix the position of the worm wheel relative to the bicycle frame and allow rotation of the worm wheel relative to the bicycle frame via rotation of the worm.

* * * * *